UNITED STATES PATENT OFFICE.

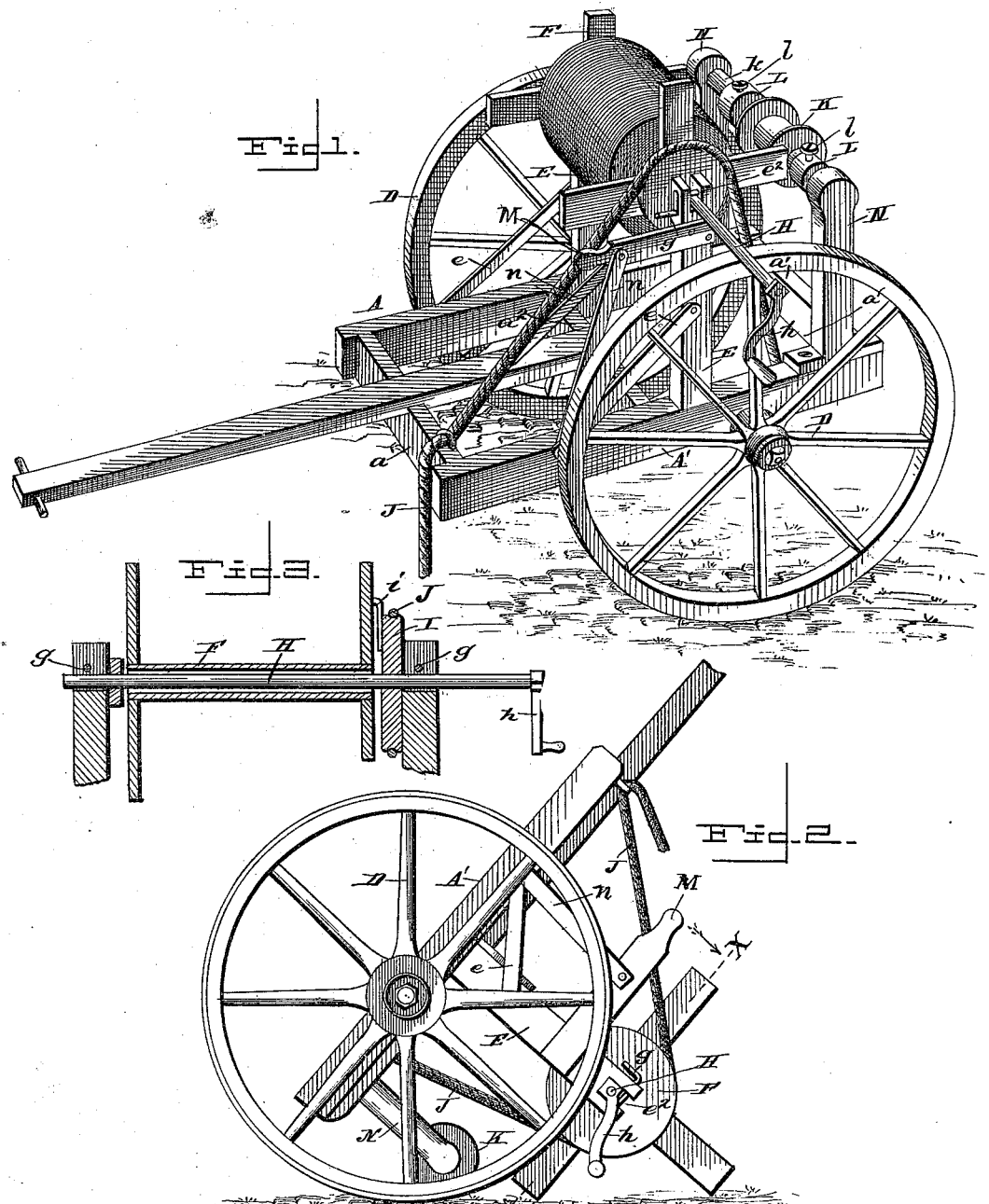

JOSEPH F. MILLER, OF HAMBURG, IOWA.

REEL-CARRIAGE.

SPECIFICATION forming part of Letters Patent No. 408,499, dated August 6, 1889.

Application filed April 26, 1889. Serial No. 308,705. (No model.)

*To all whom it may concern:*

Be it known that I, JOSEPH F. MILLER, a citizen of the United States, residing at Hamburg, in the county of Fremont and State of Iowa, have invented certain new and useful Improvements in Reel-Carriages; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wire reel-carriages, and aims to provide a carriage that will be simple and compact in construction, and which can be tipped to pick up or unload a reel, and which will guide the wire as it is wound up or unwound from the reel, so that it will wind evenly and compactly on the spool or reel.

The improvement consists of the novel construction and combination of the parts, which will be hereinafter more fully described and claimed, and which are shown in the accompanying drawings, in which—

Figure 1 is a perspective view of a reel-carriage embodying my invention. Fig. 2 is a side view of the reel-carriage, showing it tipped over and in position to take up a reel. Fig. 3 is a cross-section, parts being broken away, of the reel and its supports about on the line X X of Fig. 2.

The frame of the carriage is composed of the side bars A and A' and the end and middle cross-bars $a$ $a'$ $a^2$. The wheels D are mounted on spindles, which project from the bars A and A' near the rear end of the frame. The reel-standards E are secured at their lower ends to the bars A and A', and are braced by the rods $e$, substantially as shown, and have notches $e^2$ formed in their upper ends, which are designed to receive the journals of the reel F. The pins G, extending across the notches, hold the reel-journals against accidental displacement.

The reel F is of ordinary construction, and the shaft H, separate therefrom, is passed through the same, and the ends of the shaft form the journals for the reel to turn on. One end of the shaft is provided with the crank $h$, and the grooved brake-wheel I, placed on the said shaft, has an angle-arm $i$, which projects within the path of the arms of the reel, so as to engage therewith and effect a turning of said reel when the shaft H is turned. The strap or cable J, secured at one end to the frame and passing over the brake-wheel, has its other end slipped through a staple $j$, and is adapted to be grasped by the hand to draw upon the same and create a friction on the brake-wheel to prevent the wire paying off the reel too rapidly.

The guide-pulley K is mounted loosely on the shaft $k$, so as to slide and turn on same, and is limited in its longitudinal movements by the adjustable stops L, which are placed on the said shaft, and which comprise collars and set-screws $l$, the latter screwing in the collars and adapted to bear against the said shaft. This shaft $k$ is supported at its ends in the standards N, which are secured to the bars A and A'.

To load a reel that is wound with wire, the shaft H is passed through the same, and the carriage is tipped over and adjusted until the notches $e^2$ in the standards E fit over the journals of the reel. The pins G being put in place, the carriage is turned into an upright position, carrying the reel with it. In paying off the wire the latter rests in the guide-pulley K. The handle M, projecting from one of the reel-standards E and strengthened by the braces $n$ $n$, is adapted to be grasped by the operator to steady the carriage when operating the crank to wind the wire.

Having thus described my invention, what I claim, and desire to secure by Letters Patent, is—

1. The combination, with the frame having reel-standards and the reel having a crank, of the handle M, projecting from a reel-standard and suitably braced from the frame, substantially as described.

2. The herein shown and described reel-carriage, composed of the frame, the wheels mounted on spindles near the rear end of the frame, the standards N, the shaft $k$, supported by standards N and having adjustable stops L, the guide-pulley K, mounted on shaft $k$, the reel-standards having notches in their upper ends, pins G, the reel, the shaft H, the brake-wheel on the shaft H, having the arm $i$, the strap or cable J, and the handle M, extending from a reel-standard and suitably braced, substantially as and for the purpose described.

In testimony whereof I affix my signature in presence of two witnesses.

JOSEPH F. MILLER.

Witnesses:
J. P. BEACH,
C. D. BUTTERFIELD.